US009008811B2

(12) United States Patent
Valin et al.

(10) Patent No.: US 9,008,811 B2
(45) Date of Patent: Apr. 14, 2015

(54) METHODS AND SYSTEMS FOR ADAPTIVE TIME-FREQUENCY RESOLUTION IN DIGITAL DATA CODING

(75) Inventors: Jean-Marc Valin, Montreal (CA); Timothy B. Terriberry, Mountain View, CA (US)

(73) Assignee: Xiph.org Foundation

( * ) Notice: Subject to any disclaimer, the term of this patent is extended or adjusted under 35 U.S.C. 154(b) by 589 days.

(21) Appl. No.: 13/235,190

(22) Filed: Sep. 16, 2011

(65) Prior Publication Data

US 2012/0069898 A1 Mar. 22, 2012

Related U.S. Application Data

(60) Provisional application No. 61/384,154, filed on Sep. 17, 2010.

(51) Int. Cl.
*G06F 17/00* (2006.01)
*G10L 19/02* (2013.01)

(52) U.S. Cl.
CPC .................................. *G10L 19/0204* (2013.01)

(58) Field of Classification Search
CPC ... G10L 25/19; G10L 25/0204; G10L 25/022; G10L 25/03; G10L 25/24; G10L 25/18; H04L 1/0046
USPC .................................... 700/94; 704/500–504
See application file for complete search history.

(56) References Cited

U.S. PATENT DOCUMENTS 5,079,547 A 1/1992 Fuchigama et al.
5,778,339 A 7/1998 Sonohara et al.
5,845,241 A 12/1998 Owechko
5,960,388 A 9/1999 Nishiguchi et al.
5,983,172 A 11/1999 Takashima et al.
6,018,707 A 1/2000 Nishiguchi et al.
6,064,954 A 5/2000 Cohen et al.
6,463,097 B1 10/2002 Held et al.
6,567,777 B1 5/2003 Chatterjee
6,934,676 B2 8/2005 Wang et al.
6,993,477 B1 1/2006 Goyal
7,242,976 B2 7/2007 Minato (Continued)

OTHER PUBLICATIONS

International Searching Authority, International Search Report and Written Opinion May 30, 2012 (PCT/US12/28124).

(Continued)

*Primary Examiner* — Andrew C Flanders
(74) *Attorney, Agent, or Firm* — Dergosits & Noah LLP; Todd A. Noah

(57) ABSTRACT

Embodiments are described for a system and method for implementing an adaptive time-frequency resolution in audio and video coding systems. A method of adaptively transforming the time-frequency resolution for a defined spectrum comprises dividing the spectrum of the input signal into a into plurality of bands; determining, for each band of the plurality of bands, a characteristic of the content (e.g., tonal or transient content); modifying the time-frequency resolution value to one or more bands of the plurality of bands to increase either a time resolution of the band or a frequency resolution of the band depending on the characteristic of the content; determining a cost associated with modifying the time-frequency resolution value of the one more bands based on an entropy measure of the bands, and altering the modified time-frequency resolution values in a manner that accounts for the coding cost.

40 Claims, 5 Drawing Sheets

(56) References Cited

U.S. PATENT DOCUMENTS

| | | | |
|---|---|---|---|
| 7,275,036 | B2 | 9/2007 | Geiger et al. |
| 7,343,287 | B2 | 3/2008 | Geiger et al. |
| 7,447,631 | B2 | 11/2008 | Truman et al. |
| 7,454,330 | B1 | 11/2008 | Nishigushi et al. |
| 7,483,836 | B2 | 1/2009 | Taori et al. |
| 7,583,804 | B2 | 9/2009 | Suzuki et al. |
| 7,630,882 | B2 | 12/2009 | Mehrotra et al. |
| 7,761,290 | B2 | 7/2010 | Koishida et al. |
| 7,979,271 | B2 | 7/2011 | Bessette |
| 8,195,730 | B2 | 6/2012 | Geiger et al. |
| 8,364,471 | B2 | 1/2013 | Yoon et al. |
| 8,463,599 | B2 | 6/2013 | Ramabadran et al. |
| 8,494,863 | B2 | 7/2013 | Biswas et al. |
| 8,554,818 | B2 | 10/2013 | Zhang et al. |
| 8,620,674 | B2 | 12/2013 | Thumpudi et al. |
| 2005/0216262 | A1 | 9/2005 | Fejzo |
| 2006/0031064 | A1 | 2/2006 | Liljeryd et al. |
| 2007/0016405 | A1 | 1/2007 | Mehrotra et al. |
| 2007/0040710 | A1 | 2/2007 | Tomic |
| 2007/0063877 | A1 | 3/2007 | Shmunk et al. |
| 2007/0211804 | A1 | 9/2007 | Haupt et al. |
| 2007/0282603 | A1 | 12/2007 | Bessette |
| 2008/0010064 | A1 | 1/2008 | Takeuchi et al. |
| 2008/0031463 | A1 | 2/2008 | Davis |
| 2008/0033731 | A1 | 2/2008 | Vinton et al. |
| 2008/0126104 | A1 | 5/2008 | Seefeldt et al. |
| 2008/0140393 | A1 | 6/2008 | Kim et al. |
| 2010/0023336 | A1 | 1/2010 | Shmunk |
| 2010/0286991 | A1 | 11/2010 | Hedelin et al. |
| 2011/0035214 | A1 | 2/2011 | Morii |
| 2011/0173012 | A1 | 7/2011 | Rettelbach et al. |
| 2011/0178795 | A1 | 7/2011 | Bayer et al. |
| 2011/0264454 | A1 | 10/2011 | Ullberg et al. |
| 2012/0029924 | A1 | 2/2012 | Duni et al. |
| 2012/0029925 | A1 | 2/2012 | Duni et al. |
| 2013/0117028 | A1 | 5/2013 | Kim |
| 2013/0218577 | A1 | 8/2013 | Taleb et al. |

OTHER PUBLICATIONS

International Searching Authority, International Search Report and Written Opinion Jun. 4, 2012 (PCT/US12/28114).
International Preliminary Report on Patentability dated Sep. 19, 2013 in corresponding PCT Application No. PCT/US2012/028114.
International Preliminary Report on Patentability dated Sep. 19, 2013 in corresponding PCT Application No. PCT/US2012/028120.
International Preliminary Report on Patentability dated Sep. 19, 2013 in corresponding PCT Application No. PCT/US2012/028124.
International Searching Authority, International Search Report and Written Opinion Jun. 4, 2012 (PCT/US12/28120).
International Search Report and Written Opinion dated Sep. 16, 2011 (PCT/US11/52026).
Valin et al. "A full-bandwidth audio codec with low complexity and very low delay." Proc. EUSIPCO, 2009.
Valin et al. "A high-quality speech and audio codec with less than 10-ms delay." Audio, Speech, and Language Processing, IEEE Transactions on 18.1 (2010): 58-67.
Valin et al. "Constrained-Energy Lapped Transform (CELT) Codec", IETF Internet Draft, Jul. 4, 2009.
Kruger et al. "On Logarithmic spherical vector quantization." Information Theory and Its Applications, 2008. ISITA 2008. International Symposium on. IEEE, 2008.

METHODS AND SYSTEMS FOR ADAPTIVE TIME-FREQUENCY RESOLUTION IN DIGITAL DATA CODING

CROSS-REFERENCE TO RELATED APPLICATIONS

This application claims priority to provisional U.S. patent application No. 61/384,154, filed on Sep. 17, 2010 and entitled "Adaptive Time-Frequency Resolution In Audio Coding" which is incorporated herein in its entirety.

COPYRIGHT NOTICE

A portion of the disclosure of this patent document including any priority documents contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to digital communications, and more specifically to adaptive time-frequency techniques in codec circuits.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

The transmission and storage of computer data increasingly relies on the use of codecs (coder-decoders) to compress/decompress digital media files to reduce the file sizes to manageable sizes to optimize transmission bandwidth and memory resources. Transform coding is a common type of data compression for data such as audio signals or graphic images that helps reduce signal bandwidth through the elimination of certain information in the signal. However, this transformation is typically lossy in that the output is of lower quality than the original input. Specific compression techniques that are actually deployed may depend on the type of signal that is being processed. For example, a color graphic image may be compressed by examining small blocks of the image and averaging out the color using a discrete cosine transform (DCT) to form an image with far fewer colors in total; and an audio signal may be compressed by analyzing the transformed data according to a psychoacoustic model or other techniques that describe or model the human ear's sensitivity to parts of the signal. Although in many cases the reduction in quality from the compression may be imperceptible upon decompression and playback, certain types of content, such as high contrast (large transitions in the frequency domain) or transient (fast transitions in the time domain) signals may pose problems.

Many present compression techniques do not adequately address the problem of compression artifacts, which is the noticeable distortion caused by the application of lossy data compression. Such artifacts can be manifested as pre-echo, warbling, or ringing in audio signals, or ghost images in video data. Such artifacts are often encountered through conventional transform coding schemes applied to signals that vary greatly over time, such as speech or music. Such a signal may change drastically within a transform block, yet the level of quantization noise will remain constant within this block. Without a switch to shorter transform lengths, the equal distribution of quantization noise in compressing a transient signal can generate audible artifacts. One known approach to address this problem is temporal noise shaping, which uses a prediction approach in the frequency domain to shape the quantization noise over time. Temporal noise shaping applies a filter to the original spectrum and quantizes the filtered signal. The quantized filter coefficients are transmitted in the bitstream and used in the decoder to undo the filtering leading to a temporally shaped distribution of quantization noise in the decoded audio signal. The temporal noise shaping method is essentially a parametric method that requires the system to transmit the temporal shape based on a prediction of the shape, thus adding a degree of processing overhead to the overall coding/decoding process.

A common technique to reduce the quality degradation associated with compression processes is sub-band coding, which breaks a signal into a number of different frequency bands and encodes each one separately. Traditional sub-band audio codecs divide the signal into overlapping blocks and use a filter bank to extract the content of the signal at varying frequencies that are grouped into bands. In the audio spectrum, the size of the bands may vary to match properties of the human ear. One difficulty with this framework is selecting the right trade-off of time resolution (the size of the blocks) against frequency resolution (the size of the filter bank). For example, for transient sounds, it is preferable to have good time resolution (small blocks), while for tonal signals, it is preferable to have good frequency resolution (large blocks). In some cases, transients and tones may be present at the same time and in different regions of the spectrum. Present sub-band coding systems typically cannot accommodate both cases simultaneously. Thus, it would be useful to have the ability to select the resolution on a per-band basis in a sub-band based codec.

It is also desirable to use certain available coding information to optimize the cost of TF resolution changes. For instance, although each band is typically coded as a separate entity, there may still be dependencies between the bands. For example, one known codec predicts the energy level of a band from the coded energy level of the previous band. In this case, the coding cost for each possible T-F resolution in one band may depend on the actual coded T-F resolution in the previous band. Such information can be used to optimize the coding cost of different coding options.

BRIEF SUMMARY

Embodiments are generally directed to systems and methods for coding digital audio and video content that extend the traditional model with the ability to increase the time resolution of individual bands, or to process the same band from several adjacent blocks in order to increase their frequency resolution. An adaptive time-frequency resolution component is provided in a transform codec to provide variable time and frequency resolution for each band independently of the other bands. This allows the frequency-critical (tonal) content of the music to be coded with optimum frequency resolution, and the time-critical (transient) signals to be coded with optimum time resolution. The selectivity of time and frequency resolution on a band-by-band basis thus allows for optimum coding of either the time or frequency of a particular band based on the content of the band. When used in conjunction with a transform codec, the adaptive time-frequency resolution prevents the occurrence of certain artifacts due to quantization noise and other distortion factors.

Unlike the TNS approach described in the Background section, the adaptive time-frequency resolution technique described herein does not transmit a shape, but decides first whether temporal resolution or frequency resolution is more important by analyzing the energy and dominant characteristic of the signal. For example, in the case of an audio signal, the process determines whether each band features transient characteristics or tonal (pitch) characteristics to optimally modify the temporal resolution versus the frequency resolution, or vice-versa.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Systems and methods are described for implementing an adaptive time-frequency resolution process in digital data coding applications. Aspects of the one or more embodiments described herein may be implemented on one or more computers executing software instructions. The computers may be networked in a peer-to-peer or other distributed computer network arrangement (e.g., client-server), and may be included as part of an audio and/or video processing and playback system.

Embodiments are directed to an adaptive time-frequency resolution component for use in a sub-band audio (or video) codec. In general, sub-band coding deconstructs a signal into a number of different frequency bands and encodes each band separately. This decomposition is usually the first step in data compression for audio and video signals, in which a digital filter bank divides the input signal spectrum into some number of sub-bands. For audio input, a psychoacoustic model may look at the energy in each of these sub-bands, as well as in the original signal, and computes masking thresholds using psychoacoustic information. Each of the sub-band samples is quantized and encoded so as to keep the quantization noise below the dynamically computed masking threshold. The final step is to format all these quantized samples into data frames to facilitate eventual playback by a decoder.

Figure 1:
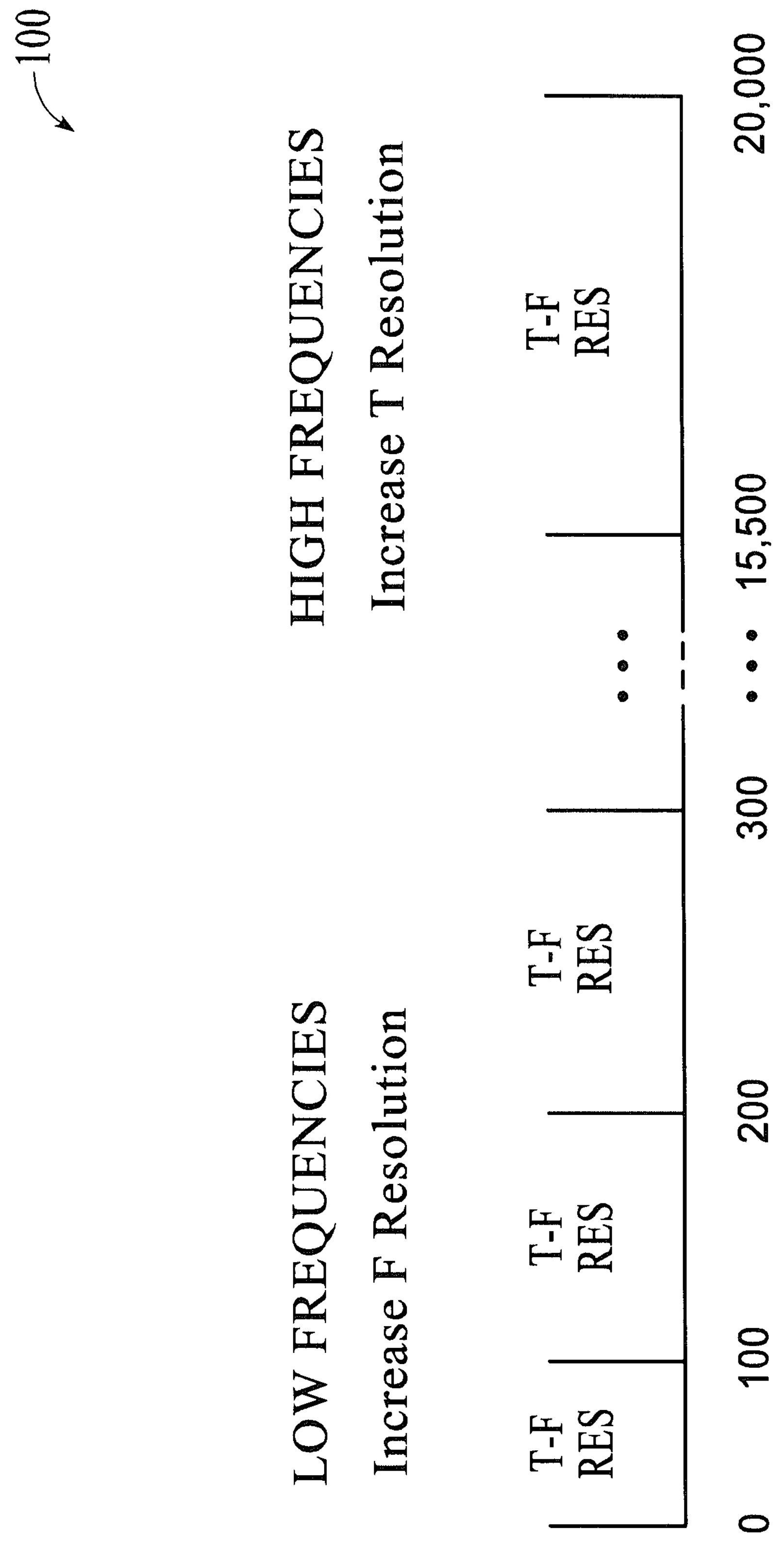
FIG. 1 illustrates an audio frequency spectrum that has been divided into a number of frequency bands for use with an adaptive time-frequency resolution component, under an embodiment.

A sub-band audio codec divides a spectrum into a set of individual frequency bands. FIG. 1 illustrates an audio frequency spectrum that has been divided into a number of frequency bands for use with an adaptive time-frequency resolution component, under an embodiment. The input signal spectrum can be divided in any appropriate manner as determined by the codec. For example, for the audio spectrum (0-20 kHz), a common sub-band division corresponds to the Bark scale, which is a psychoacoustical scale that divides the spectrum into scale ranges from 1 to 25, corresponding to the first 25 critical bands of hearing. The band edges are 0, 100, 200, 300, 400, 510, 630, 770, 920, 1080, 1270, 1480, 1720, 2000, 2320, 2700, 3150, 3700, 4400, 5300, 6400, 7700, 9500, 12000, 15500, and 20000 Hz for the entire 0-20 kHz audio spectrum. The example of spectrum 100 of FIG. 1 represents the audio spectrum divided in an arrangement based on a Bark scale range from 0 to 20,000 Hz. Other spectra and sub-band arrangements can also be used, and the spectrum of FIG. 1 is only intended to provide an example of one possible division of a spectrum into different sub-bands.

In a typical codec, the filter bank (e.g., MDCT) has a fixed resolution of time and frequency across all frequencies. This means that for a signal that is divided into frames or windows of a certain length, any noise (e.g., quantization noise) is spread across the entire duration of the window that is used by the codec. In this case, the time (T) resolution is fixed, and the frequency (F) resolution is fixed. In certain cases, however, it may be advantageous to increase the time resolution versus the frequency resolution, or vice-versa. For example, for transient sounds or impulses, such as percussion effects or cymbals, it is preferable to have good time resolution since frequency is not a particularly important parameter for these signals; and for tonal signals it is preferable to have good frequency resolution since it is more important to code the frequency component of the signal versus the other characteristics. As shown in FIG. 1, the time-frequency resolution (T-F RES) balance for each band is a tradeoff in that an increase in time resolution requires a corresponding decrease in frequency resolution, and vice-versa. Under embodiments, the adaptive T-F resolution method selects an optimal T-F resolution for each band depending on the frequency characteristics in each band. For the example spectrum 100 of FIG. 1, most tonal content in average speech or music input is present in the lower frequency bands (e.g., 100-6,000 Hz), whereas most transient content may be in the higher frequency range. In this case, the adaptive T-F resolution system will increase the frequency resolution for the low frequency bands and will increase the time resolution for the high frequency bands.

In an embodiment, the adaptive T-F resolution component uses a filter bank that adaptively alters the T-F resolution of each frame independently of the other frames of the spectrum. The filter bank is an array of band-pass filters that separates the input signal into multiple frames, each carrying a single frequency sub-band of the original signal. During decoding, the frames are unpacked, sub-band samples are decoded, and a frequency-time mapping reconstructs an output audio signal. In an embodiment, the filter banks use methods based on the modified discrete cosine transform (MDCT), which is a Fourier-related transform that is performed on consecutive blocks where the subsequent blocks are overlapped.

Figure 2:
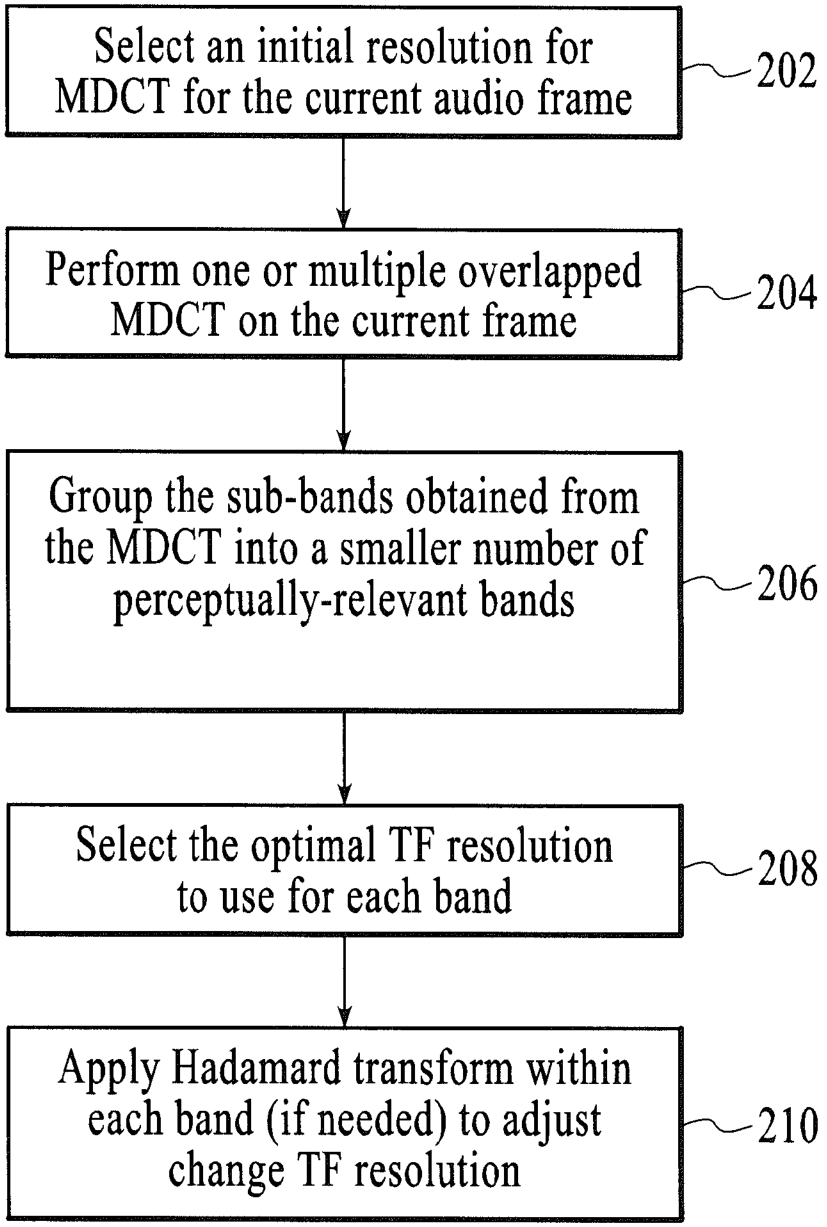
FIG. 2 is a flowchart that illustrates a method of performing adaptive time-frequency resolution in a transform codec system, under an embodiment.

FIG. 2 is a flowchart that illustrates a method of performing adaptive time-frequency resolution in a transform codec, under an embodiment. As shown in FIG. 2, the process starts by selecting an initial resolution for MDCT transform operation for the current audio frame that is being processed, block 202. The system then performs one or multiple overlapped MDCT operations on the current frame, block 204. The sub-bands obtained by the MDCT operations are then grouped into a smaller number of perceptually-relevant bands, block 204. The optimal T-F resolution to use for each band is then selected, block 206. A Hadamard transform operation is then applied within each band as needed to adjust the T-F resolution of the respective band. When multiple MDCTs are used for a single frame, it is possible to apply the forward DCT transform in the encoder to increase the frequency resolution in some bands of the sub-divided spectrum. The process computes the forward DCT on a subset of corresponding MDCT coefficients from neighboring blocks to transform the coefficients further into the frequency domain from the time domain. The larger the subset of corresponding coefficients, the finer the frequency-domain resolution of the output. The system can thus control and optimize the frequency resolution of a particular band by choosing the size of the forward DCT applied. For example, by computing a two-point forward DCT for of each pair of corresponding MDCT coefficients from adjacent blocks, the system can increase the frequency resolution by a factor of two. Similarly, four-point forward DCTs will increase the frequency resolution by a factor of four, and so on. To optimize the time-frequency resolution in each band, the process can be applied in some regions of the spectrum and not in others.

In an embodiment, the T-F resolution component includes an approximation process to optimize resource use. Because of memory and complexity issues, it is often desirable to approximate the inverse DCT instead of performing cosine operations. In embodiment, the Hadamard transform is used to approximate the DCT and inverse DCT operations, because it has similar properties and requires only addition and subtraction functions. It performs an orthogonal, symmetric, involutional, linear operation on $2^n$ real numbers. The Hadamard transform can be regarded as being built out of size-2 discrete Fourier transforms (DFTs), and is equivalent to a multidimensional DFT of size $2^n$. Whereas, the DCT uses cosines and multiplication operations on cosine functions, the Hadamard transform only requires multiplication by 1 or −1 and can thus be implemented through simple adding or subtracting operations, which helps realize significant processing reduction. As an alternative to the Hadamard transform, it should be noted that any perfect reconstruction sub-band filter bank can be used for the approximation of the inverse DCT operations.

The time-frequency resolution in each band can be changed by any integer factor (e.g., a power of two for simplicity or a power of five for a 5-point DCT). The highest frequency resolution possible corresponds to the inverse of the window length. The highest time resolution is limited by the number of powers of two in the size of the band. Knowing the transformation applied in the encoder, that is, the number of steps and direction of the resolution change, the decoder applies the opposite transform to obtain the original MDCT spectrum. The required resolution change is then encoded in the codec's bitstream.

In general, the adaptive T-F resolution process comprises two main steps of determining the optimum T-F resolution per frame and determining the most efficient way to provide this information from the encoder to the decoder. The T-F resolution decision for each band is performed in an encoder circuit. The T-F resolution value for each band is then transmitted to a decoder circuit where it is applied on the decode side. The system also makes a determination regarding how best to code the T-F decision to reduce the space and bandwidth required for the decoder. That is, the system determines how best to determine the appropriate T-F values and transmit them in the most efficient manner. An inefficient T-F resolution is considered to have a high rate-distortion (RD) value. In certain cases, the optimum determined T-F value may exhibit a high rate-distortion value, and thus may be further modified to increase this efficiency or left unchanged. For example, if there is a change in the T-F resolution for every band, then a lot of space and bandwidth may be used. In this case, the T-F resolution may not be changed for certain of these bands to reduce the resource overhead.

Figure 3:
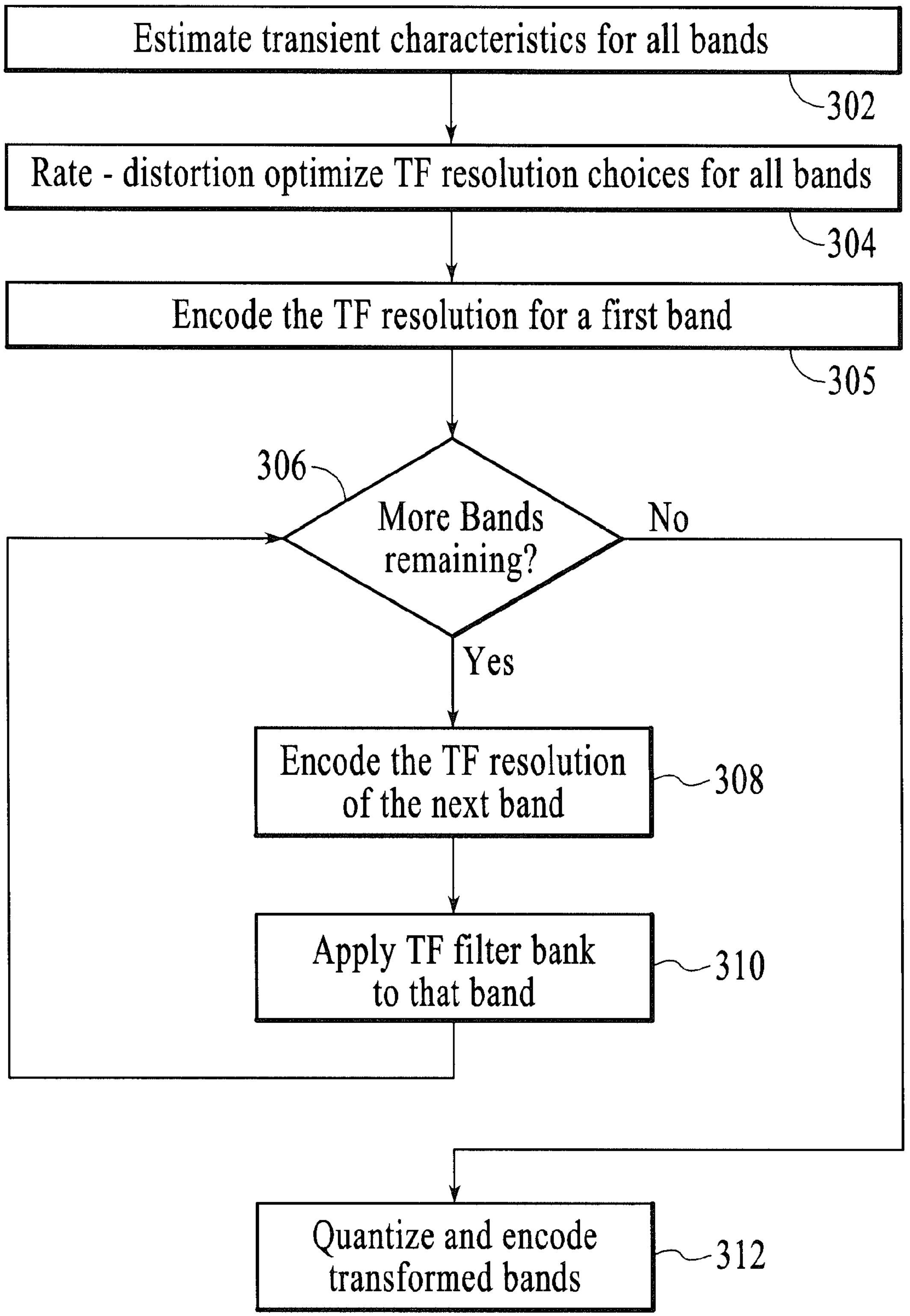
FIG. 3 is a flowchart that illustrates a method of determining the optimum T-F resolution values for each band, under an embodiment.

As stated above, a first step in the adaptive T-F resolution process is the determination of the optimal T-F value for each band of the input signal spectrum. FIG. 3 is a flowchart that illustrates a method of determining the optimum T-F resolution values for each band, under an embodiment. The process basically involves checking each band to determine whether there is more time-intensive content (e.g., transients or impulses) or more frequency-intensive (pitch) content. As shown in FIG. 3, the process begins by examining and estimating the transient characteristics for all of the bands, block 302. Bands that feature higher transient characteristics will be transformed to increase the time (T) resolution, and bands that feature lower transient characteristics will be transformed to increase the frequency (F) resolution.

The rate-distortion value is then determined for all of the bands to optimize the T-F resolution choices based on the resource overhead constraints, block 304. Block 304 basically addresses the issue that how much it costs to code a decision in one band depends on the decision coded in another, so all bands must be considered together to optimize the T-F choices with regard to coding cost. Blocks 302 and 304 together result in a particular decision whether or not to shift the T-F resolution of each band from a default value to one that favors either increased or decreased time resolution with respect to frequency resolution. In an embodiment, an entropy measurement may be used to select the optimal T-F resolution based on the content of a band and the coding cost. In this case, a particular T-F resolution for each band is set and compared against a defined measure of entropy. The T-F resolution value is then changed to see whether the entropy level is lowered or raised. If the entropy level is lowered as a result in the change in resolution value, this implies that less information is required to effect the transformation, and the MDCT resolution may then be changed in that direction. In an alternative embodiment, an energy stability metric that looks for abrupt changes in energy may be used as opposed to the entropy measure.

Once the optimum T-F resolution value is determined for each band, these values are written out for each band in real time. The transform T-F resolution values are applied per band, one at a time, and sent out for each band one at a time. Thus, as shown in block 305, the T-F resolution for the first band is encoded and an iterative process is performed for all of the remaining bands through decision block 306. For each remaining band, the T-F resolution is encoded, block 308, and the T-F filter bank is applied to each bank, block 312. After all bands have been processed such that their respective T-F resolution values are encoded, these values are quantized for incorporation into the bitstream that is transmitted to the decoder, block 312.

With respect to making decoder efficient by reducing the rate-distortion effect as shown in block 304 of FIG. 3, the encoder tries to minimize the space used while trying to keep the T-F resolutions optimum. In an embodiment, to minimize the bitrate required to code the T-F information, prediction and entropy coding are used. The probability that a band uses the same resolution as the previous band is typically high, so it requires fewer bits to encode. To further simplify the problem, the system considers only two possible values for the time-frequency resolution, such that the coded information is binary with unequal probability. The two T-F values may themselves be selected from a codebook of two or more value pairs. In that case, the codebook entry is coded once per frame, and one binary value is coded per band. Each binary value indicates whether to switch from the current time-frequency resolution to the other alternative. A switch from one T-F resolution value to another is more "expensive" with respect to overhead in that it requires more bits, but is generally less likely than keeping the same time-frequency resolution as the previous band. The encoder chooses the resolution of each band by performing rate-distortion optimization to trade off the cost of coding the binary values against the distortion criterion used to select the optimal T-F resolution for each band. In an embodiment, a Viterbi trellis operation is performed to determine the optimal changes to the T-F resolution values for all of the bands on a band-by-band basis.

Figure 4:
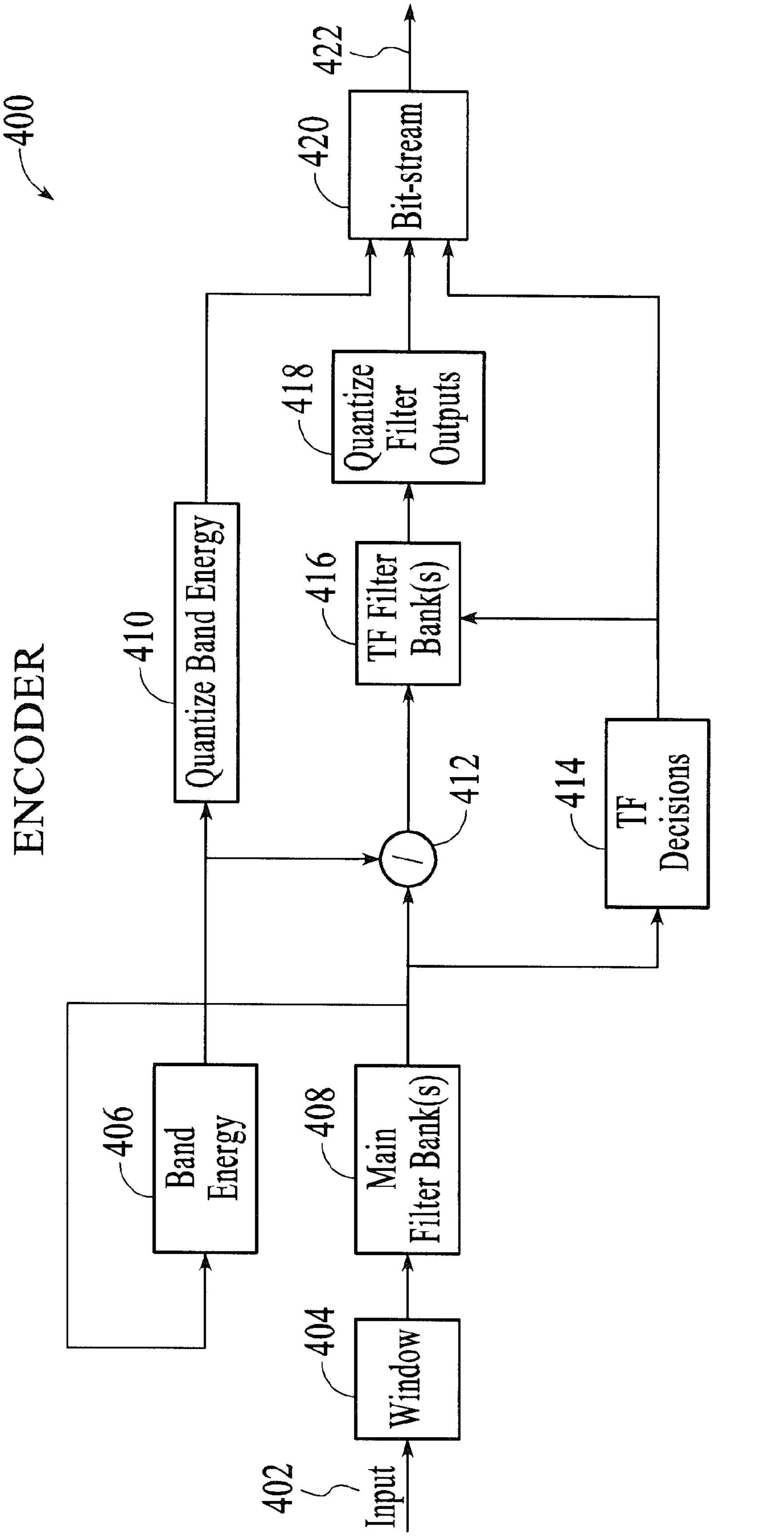
FIG. 4 is a block diagram of an encoder circuit for use in an adaptive T-F resolution system, under an embodiment.
Figure 5:
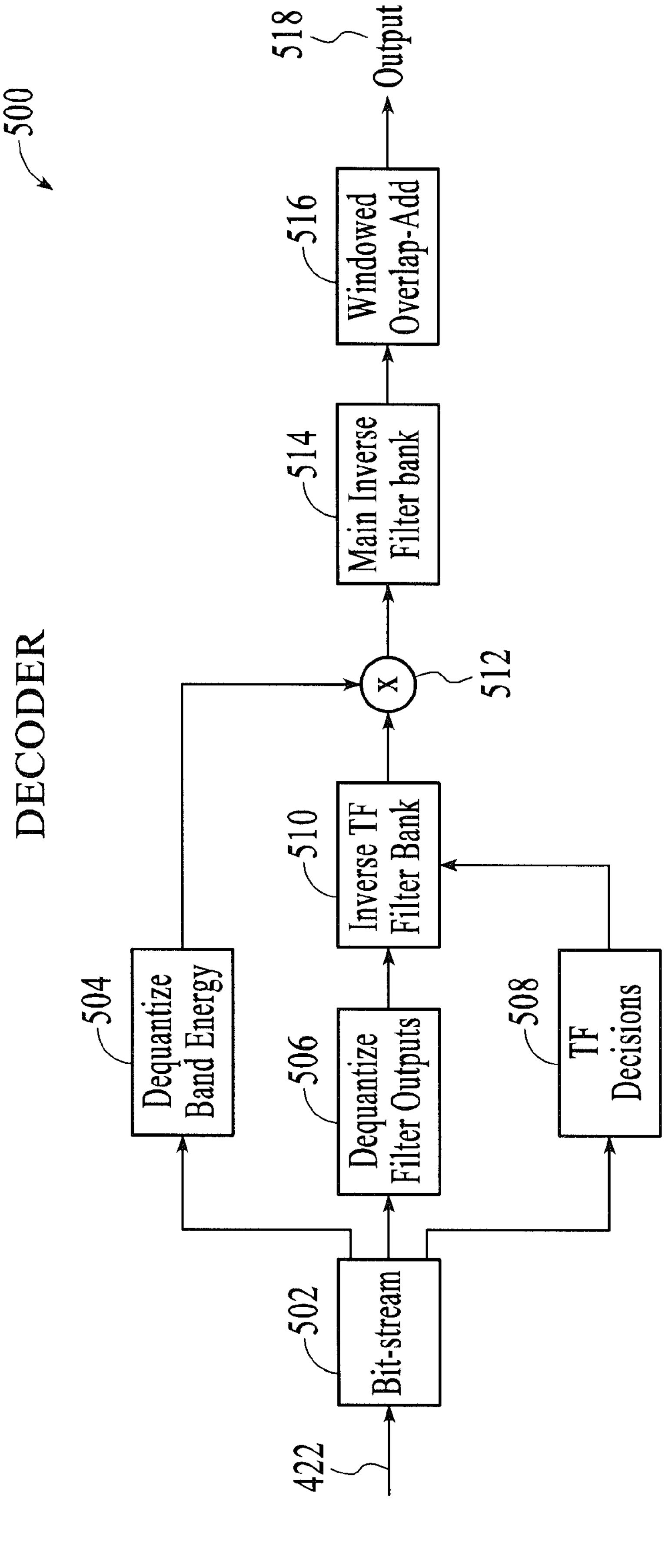
FIG. 5 is a block diagram of a decoder circuit for use in an adaptive T-F resolution system, under an embodiment.

In an embodiment, the adaptive time-frequency resolution process may be implemented through circuitry and/or a program that is embodied within separate encoder and decoder subsystems. FIG. 4 is a block diagram of an encoder circuit for use in an adaptive T-F resolution system, under an embodiment, and FIG. 5 is a block diagram of a decoder circuit for use in an adaptive T-F resolution system, under an embodiment.

With respect to the encoder system 400, the input 402 comprises the source signal (typically an audio signal) that is input to a forward MDCT function which windows the signal in window block 404 and applies the main fixed resolution filter bank 408 to the windowed signal. The energy of the signal in each band is determined by band energy block 406. The computed energy value is then quantized in block 410. This quantized band energy information is incorporated as part of the bitstream 420 that forms the input through a transmission line 422 of the decoder 500. The encoder circuit of FIG. 4 and the decoder circuit of FIG. 5 illustrate an embodiment of a codec circuit that uses energy information for normalization of signal values. Other codecs that do not require or use energy values may also be used, in which case the energy normalization steps may be omitted.

With respect to the encoder circuit of FIG. 4, the signal outputs from the filter bank 408 are normalized through function 412 by dividing the signal values by the band energy 406 to ensure that the energy in each band is one. The non-normalized band energy is also used with the signal values in each band and processed through T-F decision block 414. The T-F decisions block 414 determines how far to modify the T-F resolution value for each band. In an embodiment, an initial T-F resolution value is provided for each band and then modified based on the time-frequency content of the band and the cost overhead associated with the modification, such as by using the entropy process as described above with respect to FIG. 3. In one embodiment, the T-F decisions block 414 analyzes the filter bank 408 signal and the per-band energy value and the single entropy measure to determine the T-F resolution value for each band. This decision value provides an indication of whether the T or F resolution should be increased relative to the other. In one embodiment, only two choices are allowed for each band, resulting in one-bit per band (e.g., 25 bands=25 bits). In an embodiment, the resulting bit pattern to code the T-F resolution transforms can be further compressed, such as through the rate-distortion process that indicates whether an immediately neighboring band (previous or subsequent) has been changed relative to a specific band.

The output from the T-F decisions block 414 is input to the T-F filter bank block 416 along with the normalized filter bank output (from division operation 412) to apply the forward MDCT function. In an embodiment in which estimation processes are used for the DCT functions, a Hadamard transform operation may be implemented in block 416. Since a Hadamard transform is its own inverse, a the same transform may be used in place of both the forward DCT normally applied to increase the frequency resolution and the inverse DCT normally applied to increase the time resolution.

The transform outputs from TF filter bank 416 are then quantized in quantizer block 418 and comprise part of the bitstream 420 that forms the decoder input through the transmission line 422. The T-F decision information is also included as part of the bitstream 420 so that the final decoder input through the transmission line 422 comprises the quantized band energy for each band, the quantized filter outputs of the signal in each band, and the T-F decisions for each band. This output can then be provided to an encoder section of the adaptive T-F resolution system.

FIG. 5 is a block diagram of the decoder section of the adaptive T-F resolution system, under an embodiment. The decoder 500 receives the bitstream input through the transmission line 422 from the encoder 400 into bitstream block 502. The bitstream block 502 parses the bitstream into its constituent parts including the band energies, the filter output, and the T-F decision values. The quantized band energy component is sent to a band energy dequantizer block 504, which determines the magnitude of the energy in each band. The filter output dequantizer block 506 receives the quantized filter output information that is generated in the encoder and reconstructs the output filter coefficients that were produced by the encoder. These are then run through the inverse T-F filter bank block 510. Likewise, the T-F decisions block 508 takes the T-F decision values that were produced by the encoder to determine which transform to use for each band. This is also applied to the inverse T-F filter bank block 510 so that it knows the size of the Hadamard transform to apply to each band. The output from the inverse T-F filter bank 510 is then combined in function 512 with the dequantized band energy values 504 so that it is scaled by the energy in each band. This output is then processed through the main inverse filter bank 514, which in one embodiment is a fixed-resolution MDCT filter bank. The output of this filter bank is windowed and overlapped with the subsequent bands through windowed overlap-add block 516 to produce output 518. Output 518 encapsulates the information regarding certain bands having a higher F resolution than T resolution, and vice-versa.

As stated above, in an embodiment, the T-F resolution selection for each band is expressed as a T-F value pair that may be selected from a codebook of two or more value pairs, where the value pairs dictate how to transform the T-F resolution for the frame. Certain codecs may allow a greater number of value pairs, such as up to four different value pairs for a current frame. To reduce processing overhead, the adaptive time-frequency resolution method restricts the selection to one of two pair values. For example, a codebook may be embodied as a table that says given considerations already given, for all similar bands in the frame, the T-F resolution choices are a/b or c/d (e.g., 0/3 or −2/1 as two example value pairs). The ultimate selection decision is only between these two value pairs, which requires only coding a binary decision for this band.

Although embodiments have been described and illustrated with respect to processing signals in the audio spectrum (0-20 kHz), it should be noted that embodiments can also be directed towards performing adaptive time-frequency resolution in virtually any other spectrum, such as the image or video spectrum. In general, video can have up to three dimensions (horizontal, vertical, time) versus audio, which is a one-dimensional signal. Therefore, when used in image or video applications, the adaptive time-frequency resolution process described herein can be performed once for the first dimension, and again for the second dimension. Furthermore, video processing systems typically do not use an MDCT process, but rather a Type-II DCT process, since they do not need the increased frequency selectivity of MDCTs. Thus the encoder and decoder sections of FIGS. 4 and 5 would employ (possibly lapped) DCT functions as opposed to MDCT functions to improve the coding gain characteristics. It should be noted that virtually any appropriate fixed resolution transform may be used, however. When processing a video spectrum, the encoder section does not necessarily need to compute the band energy so that it may be divided out so that the bank signals are normalized.

Embodiments are directed to a process of separating a received signal into a plurality of bands by grouping sub-bands obtained from a filter bank process or a first transform process. The input signal is received and turned into sub-bands. The bands that are processed are essentially groups of sub-bands. Depending an implementation, the MDCT will typically produce up to 960 sub-bands that are each 50 Hz wide (this configuration may vary, however). These sub-bands are then grouped into around 20 bands of non-uniform width. For audio signals, these bands are based on the Bark scale, and thus roughly follow the width of Bark bands. The T-F transform process is then applied to each of these groups of sub-bands.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of adaptively transforming the time-frequency resolution of a signal containing content over a defined spectrum, comprising:

separating the received signal into a plurality of bands by grouping sub-bands obtained by a first transform process;

determining, for each band of the plurality of bands, a desired change of the time-frequency resolution of each band;

applying a specific time-frequency (T-F) transform value to at least one of the bands to increase either a time (T) resolution of the respective band or a frequency (F) resolution of the respective band depending on the desired change of the time-frequency resolution of the respective band; and applying a second T-F transform value to at least another of the bands to increase the other of wither a time (T) resolution of the respective band or a frequency (F) resolution of the respective band depending on the desired change of the time-frequency resolution of each band.

2. The method of claim 1, wherein the content comprises audio content and wherein the dominant characteristic comprises one of tonal content or transient content, the method further comprising:

increasing the frequency resolution of a band if the band has predominantly tonal content; and increasing the time resolution of a band if the band has predominantly transient content.

3. The method of claim 1 wherein the specific time-frequency transform to increase the T or F resolution is a DCT (Discrete Cosine Transform) function.

4. The method of claim 1 wherein the specific time-frequency transform to increase the T or F resolution is a binary-basis function comprising an approximation of a DCT (DCT) function.

5. The method of claim 1 wherein the binary-basis function comprises a Hadamard transform function.

6. The method of claim 1 wherein the first transform process is one of: a filter bank selection process, a lapped transform (LT), or a discrete cosine transform (DCT).

7. The method of claim 1 wherein the T-F transform value comprises a binary value pair, the method further comprising coding the T-F transform using a variable rate coding scheme to compress information representing multiple bands of the plurality of bands having the same T-F transform value.

8. The method of claim 7 wherein the variable rate coding scheme comprises arithmetic/range coding.

9. The method of claim 7 wherein the T-F transform value is selected from a selection of two possible binary value pairs.

10. The method of claim 7 further comprising:

determining an initial entropy value for a given T-F resolution value;

determining a change in the entropy value for a change in the give T-F resolution value; and selecting the modified T-F resolution value based on the changed entropy value.

11. The method of claim 10 further comprising using a Viterbi Trellis algorithm for selection of the T-F transform value using the entropy factors.

12. The method of claim 1 wherein the signal comprises one of an audio signal, an image signal, and a video signal.

13. The method of claim 12 wherein the signal comprises an audio signal, and further wherein the bands are based on a Bark scale division of the audio spectrum.

14. A method of coding the time-frequency resolution for a defined spectrum, comprising:

defining an initial time-frequency (T-F) resolution value for the spectrum as a whole based on a measure of tonal content versus transient content of the spectrum;

dividing an input signal into a plurality of bands that comprise the spectrum;

modifying the time-frequency resolution value of one or more bands of the plurality of bands to increase either a time (T) resolution of the band or a frequency (F) resolution of the band depending on the relative transient content or tonal content in the band;

determining a cost associated with modifying the time-frequency resolution value of the one more bands based on an entropy measure of the bands;

altering the one or more modified time-frequency resolution values to minimize the cost and to generate a selected time-frequency resolution value for each band; and modifying the time frequency resolution value of one or more other bands of the plurality of bands to increase the other of either a time (T) resolution of the band or a frequency (F) resolution of the band depending on the relative transient content or tonal content in the band.

15. The method of claim 14 wherein the bitstream comprises quantized filter output signals each band and the selected T-F resolution value for each band.

16. The method of claim 15 further comprising decoding the bitstream in the decoder to apply the selected T-F resolution values for each band to the input signal in order to suppress compression artifacts generated by compressing the input signal in a codec upon playback of the input signal.

17. The method of claim 16 wherein the input signal comprises an audio signal and further wherein the bands are based on a Bark scale division of the audio spectrum.

18. The method of claim 1 further comprising encoding the time-frequency transform value for each band in a bit-stream for transmission to a decoder.

19. The method of claim 18 wherein:

if a band of the plurality of bands has predominantly tonal content, the frequency resolution of the band is increased; and if a band of the plurality of bands has predominantly transient content, the time resolution of the band is increased.

20. The method of claim 14 wherein the time-frequency modification value is applied using a process comprising one of: a DCT function, a binary-basis function to approximate a DCT function, and a Hadamard transform.

21. The method of claim 14 wherein the T-F transform value comprises a binary value pair, the method further comprising coding the T-F transform using a variable rate coding scheme to compress information representing multiple bands of the plurality of bands having the same T-F transform value, and wherein the T-F transform value is selected from a selection of two or more possible binary value pairs.

22. The method of claim 21 wherein the T-F transform value is selected based on an entropy measure, the method further comprising:

determining an initial entropy value for a given T-F resolution value;

determining a change in the entropy value for a change in the give T-F resolution value; and selecting the modified T-F resolution value if the changed entropy value is lower than the initial entropy value.

23. The method of claim 22 further comprising using a Viterbi Trellis algorithm for selection of the T-F transform value using the entropy factors.

24. A system for adaptively transforming the time-frequency resolution of a signal containing content over a defined spectrum, comprising:

a filter bank component separating the received signal into a plurality of bands by subdividing the defined spectrum;

a content analyzer component determining a desired characteristic of the content for each band of the plurality of bands;

a time-frequency resolution component applying a specific time-frequency (T-F) transform value to each band to increase either a time (T) resolution of the band or a frequency (F) resolution of the band depending on the desired characteristic, wherein at least one band is transformed for increased time resolution and at least another band is transformed from increased frequency resolution; and a transmission line configured to transmit the transformed signal containing content.

25. The system of claim 24 further comprising an encoder stage encoding the time-frequency transform value for each band in a bitstream for transmission to a decoder.

26. The system of claim 25 wherein the bitstream comprises quantized filter output signals each band.

27. The system of claim 26 wherein the decoder decodes the bitstream to apply the selected T-F resolution values for each band to the input signal in order to suppress compression artifacts generated by compressing the input signal in a codec upon playback of the input signal.

28. The system of claim 27 wherein the input signal comprises an audio signal and further wherein the bands are based on a Bark scale division of the audio spectrum.

29. The system of claim 28 wherein the desired characteristic comprises tonal content or transient content of the signal, and further wherein:

if a band of the plurality of bands has predominant tonal content, the frequency resolution of the band is increased; and if a band of the plurality of bands has predominant transient content, the time resolution of the band is increased.

30. The system of claim 24 wherein the T-F resolution value is transformed using a process comprising one of: an MDCT function, a binary-basis function to approximate an MDCT function, and a Hadamard transform.

31. The system of claim 30 wherein the T-F transform value comprises a binary value pair, the method further comprising coding the T-F transform using a variable rate coding scheme to compress information representing multiple bands of the plurality of bands having the same T-F transform value, and wherein the T-F transform value is selected from a selection of two or more possible binary value pairs.

32. The system of claim 31 wherein the T-F transform value is selected based on an entropy metric, the method further comprising:

determining an initial entropy value for a given T-F resolution value;

determining a change in the entropy value for a change in the give T-F resolution value; and selecting the modified T-F resolution value if the changed entropy value is lower than the initial entropy value.

33. A method comprising:

receiving a bitstream from an encoder, wherein the bitstream includes a quantized output of a time-frequency (T-F) resolution change for at least two groups of sub-bands processed by the encoder, wherein at least one group of sub-bands is processed from increased time resolution and at least another group of sub-bands is processed for increased frequency resolution;

applying an inverse T-F filter bank process to each of the group of sub-bands; and processing each of the groups of sub-bands through a windowed overlap-add process to produce an output encapsulating information regarding a relative time resolution versus frequency resolution for each of the groups of sub-bands.

34. The method of claim 33 wherein the bitstream is encoded in the encoder by:

separating an original received content signal into a plurality of bands by grouping sub-bands obtained by a first transform process;

determining, for each band of the plurality of bands, a desired change of the time-frequency resolution of each band; and applying a specific time-frequency (T-F) transform value to at least one of the bands to increase either a time (T) resolution of the respective band or a frequency (F) resolution of the respective band depending on the desired change of the time-frequency resolution of each band.

35. The method of claim 34 wherein the encoder includes a process for determining a cost associated with modifying the time-frequency resolution value of the one more bands based on an entropy measure of the bands, and altering the modified time-frequency resolution values to minimize the cost and to generate a selected time-frequency resolution value for each band.

36. The method of claim 35 wherein the encoder further includes a process for:

determining an initial entropy value for a given T-F resolution value;

determining a change in the entropy value for a change in the give T-F resolution value; and selecting the modified T-F resolution value based on the changed entropy value.

37. The method of claim 33 wherein the encoder includes a process that defines an initial time-frequency (T-F) resolution value for the spectrum as a whole based on a measure of tonal content versus transient content of the spectrum;

divides an input signal into a plurality of bands that comprise the spectrum;

modifies the time-frequency resolution value of one or more bands of the plurality of bands to increase either a time (T) resolution of the band or a frequency (F) resolution of the band depending on the relative transient content or tonal content in the band;

determines a cost associated with modifying the time-frequency resolution value of the one more bands based on an entropy measure of the bands; and alters the modified time-frequency resolution values to minimize the cost and to generate a selected time-frequency resolution value for each band.

38. A system comprising:

a transmission line configured to receive a transformed signal containing content;

a decoder stage receiving a bitstream from the transmission line, wherein the bitstream includes a quantized output of a time-frequency (T-F) resolution change for at least two groups of sub-bands processed by the encoder, wherein at least one group of sub-bands is processed for increased time resolution and at least another group of sub-bands is processed for increased frequency resolution;

an inverse T-F filter bank component applying and inverse T-F filter bank process to each of the group of sub-bands; and a window overlap-add component processing each of the group of sub-bands to produce an output encapsulating information regarding a relative time resolution versus frequency resolution for each of the groups of sub-bands.

39. The system of claim 38 wherein the bitstream is encoded in the encoder by:

a grouping component separating an original received content signal into a plurality of bands by grouping sub-bands obtained by a first transform process;

a time-resolution determination component determining, for each band of the plurality of bands, a desired change of the time-frequency resolution of each band; and a transform component applying a specific time-frequency (T-F) transform value to at least one of the bands to increase either a time (T) resolution of the respective band or a frequency (F) resolution of the respective band depending on the desired change of the time-frequency resolution of each band.

40. The system of claim 39 wherein the encoder component includes a cost determination module determining a cost associated with modifying the time-frequency resolution value of the one more bands based on an entropy measure of the bands, and altering the modified time-frequency resolution values to minimize the cost and to generate a selected time-frequency resolution value for each band.

* * * * *